United States Patent
Ringk et al.

(10) Patent No.: US 12,160,020 B2
(45) Date of Patent: *Dec. 3, 2024

(54) METHOD FOR FORMING A CONNECTION BETWEEN BATTERY CELLS, AND BATTERY MODULE

(71) Applicant: Robert Bosch GmbH, Stuttgart (DE)

(72) Inventors: Andreas Ringk, Bamberg (DE); Anton Ringel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 705 days.

This patent is subject to a terminal disclaimer.

(21) Appl. No.: 17/189,374

(22) Filed: Mar. 2, 2021

(65) Prior Publication Data

US 2021/0273300 A1 Sep. 2, 2021

(30) Foreign Application Priority Data

Mar. 2, 2020 (DE) .......................... 102020202644.0

(51) Int. Cl.
*H01M 50/514* (2021.01)
*H01M 50/521* (2021.01)

(52) U.S. Cl.
CPC ....... *H01M 50/514* (2021.01); *H01M 50/521* (2021.01)

(58) Field of Classification Search
CPC .. H01M 50/514; H01M 50/521; H01M 50/20; H01M 50/522; Y02E 60/10
See application file for complete search history.

(56) References Cited

U.S. PATENT DOCUMENTS

| | | | |
|---|---|---|---|
| 2009/0117456 A1* | 5/2009 | Hosaka | H01M 10/0418 429/152 |
| 2015/0140411 A1 | 5/2015 | Li et al. | |
| 2015/0180099 A1 | 6/2015 | Hino et al. | |
| 2016/0197315 A1* | 7/2016 | Tatsumi | H01M 50/213 429/185 |
| 2019/0348650 A1 | 11/2019 | Nakamoto | |

* cited by examiner

*Primary Examiner* — Jacob T Minskey
*Assistant Examiner* — Caroline Beha
(74) *Attorney, Agent, or Firm* — Michael Best & Friedrich LLP

(57) ABSTRACT

A method for forming a connection between a first battery cell (1) and a second battery cell (2), wherein, in a first method step, an adhesive (3) comprising at least one first component (31) and at least one second component (32) is applied to the first battery cell (1), wherein a first proportion (41) of the at least one first component (31) and/or a second proportion (42) of the at least one second component (32) is changed during the application of the adhesive (3) over the first battery cell (1), wherein, in a second method step, the first battery cell (1) is connected to the second battery cell (2) in such a way that an inhomogeneous material bond is formed between the first battery cells (1) and the second battery cell (2).

7 Claims, 3 Drawing Sheets

METHOD FOR FORMING A CONNECTION BETWEEN BATTERY CELLS, AND BATTERY MODULE

BACKGROUND OF THE INVENTION

The invention proceeds from a method for forming a connection between battery cells. An object of the present invention is also a battery module having two battery cells connected to one another formed by such a method.

It is known from the prior art that battery modules can consist of a plurality of individual battery cells which can be electrically conductively connected to one another in series and/or in parallel, with the result that the individual battery cells are interconnected to form the battery module.

Furthermore, such battery modules are interconnected to form batteries or battery systems.

In this respect, it is possible, for example, for the plurality of battery cells to be braced to one another in order to connect them to one another.

SUMMARY OF THE INVENTION

The method according to the invention offers the advantage that a material bond can be formed between two battery cells, in which material bond it is possible for the adhesive surfaces thereof and thus for example likewise the adhesive forces thereof to be distributed inhomogeneously. As a result, the robustness, flexibility and thermal conductivity of the material bond can be adapted optimally to a respectively required behaviour, in particular to the ageing behaviour of the respective battery cell.

For this purpose, according to the invention, a method for forming a connection between a first battery cell and a second battery cell is provided. In this respect, in a first method step, an adhesive is applied to the first battery cell.

The adhesive comprises in this case at least one first component and at least one second component. Furthermore, a first proportion of the at least one first component and/or a second proportion of the at least one second component is changed during the application of the adhesive over the first battery cell.

In a second method step, the first battery cell is connected to the second battery cell in such a way that an inhomogeneous material bond is formed between the first battery cell and the second battery cell.

In particular, such a method according to the invention offers the advantage that the material bond is inhomogeneously formed in such a way that an inhomogeneity forms in a plane arranged parallel to that surface of the first battery cell which is connected to the second battery cell. In particular, such a plane should be referred to as the connecting plane.

It should be pointed out at this juncture that the inhomogeneity of the material bond in addition to the adhesive force can also be targeted at any properties, such as for example a thermal conductivity, a hardness, an elasticity or a resistance to chemicals.

An inhomogeneous material bond makes it possible to form gradients of these different properties over the connecting plane.

In particular, it is also possible to form any desired gradient patterns.

A suitable selection of the at least one first component and the at least one second component makes it possible to adapt these gradients reliably to respectively desired requirements.

The at least one first component of the adhesive and the at least one second component of the adhesive are expediently mixed with one another before the application. This offers the advantage that a reliable ratio of the first proportion of the at least one first component to the second proportion of the at least one second component can be obtained, for example, by an additional mixing device. Moreover, such a mixing operation makes it possible to ensure that an optimum adhesive force is formed.

An object of the present invention is furthermore also a further method for forming a connection between the first battery cell and the second battery cell. In this respect, in a first method step, the adhesive is applied to the first battery cell. The adhesive likewise comprises at least one first component and at least one second component. Furthermore, the at least one first component and the at least one second component are applied one on top of the other in a height direction. It should be pointed out at this juncture that one on top of the other should be understood to mean that the first component is arranged above the second component in a height direction which is arranged for example perpendicularly to the connecting plane described in the introduction. Furthermore, in a second method step, the first battery cell is connected to the second battery cell in such a way that an inhomogeneous material bond is formed between the first battery cell and the second battery cell.

This method offers the particular advantage that a material bond which is inhomogeneous in a height direction can be formed. This makes it possible, for example, also to form an inhomogeneity in the height direction in addition to formation in the connecting plane.

In particular, the formation of the inhomogeneous material bond can be assisted by a pressing-together operation in both methods of the present invention. For this purpose, for example, the first battery cell can be connected to the second battery cell under the effect of pressure. It may also be sufficient to use only the dead weight of the first battery cell or of the second battery cell.

It is particularly expedient when the adhesive in a first region is applied in such a way that the first proportion of the at least one first component is higher than the second proportion of the at least one second component and the adhesive in a second region is applied in such a way that the second proportion of the at least one second component is higher than the first proportion of the at least one first component.

As a result, an inhomogeneous material bond with an inhomogeneity in the connecting plane can be formed in a particularly reliable manner.

It is in particular expedient here when the at least one first component forms a lower adhesive force than the at least one second component, and that the first region is arranged closer to a peripheral region of the first battery cell than the second region. A consequently formed inhomogeneity in the connecting plane makes it possible to establish gradients which can reduce or even avoid inhomogeneous loads, for example stresses, within the material bond that occur during the operation of a battery module.

A design in which the at least one first component forms a lower adhesive force than the at least one second component makes it possible to reduce or even avoid a stress caused by deformation behaviour of the first battery cell or of the second battery cell in the first region. In particular, it is expedient when the at least one first component has a softer form than the at least one second component.

By way of example, the at least one first component can be a comparatively soft component with a comparatively low thermal conductivity and the at least one second component can be a comparatively hard component with a comparatively high thermal conductivity. This makes it possible to adapt the material bond optimally to the needs of the connection between the first battery cell and the second battery cell.

It should be pointed out at this juncture that the first battery cell and the second battery cell are preferably each formed as a prismatic battery cell.

It is advantageous when the adhesive is applied in a uniformly distributed manner. In particular, the adhesive is applied to the first battery cell in a manner uniformly distributed over the first battery cell.

This makes it possible to form a reliable connection between the first battery cell and the second battery cell.

It is also advantageous when the adhesive is applied with a plurality of portions arranged parallel to one another. This makes it possible to apply the adhesive with a particularly uniform distribution.

It is furthermore advantageous when the adhesive is applied in a continuously running strand. This makes it possible to design a comparatively quick application of the adhesive.

Overall, a method according to the invention offers the advantage that extra costs and longer process times can be avoided and the method is overall also suitable for series production.

In general, it is also pointed out that the adhesive is of course not restricted to the at least one first component and the at least one second component. It is possible that the adhesive comprises a further plurality of different components.

It is preferable for the at least one first component and/or the at least one second component to be selected from an epoxy, acrylate, silicone or urea.

BRIEF DESCRIPTION OF THE DRAWINGS

Exemplary embodiments of the invention are illustrated in the drawings and explained in more detail in the following description.

In the figures.

DETAILED DESCRIPTION

Figure 1:
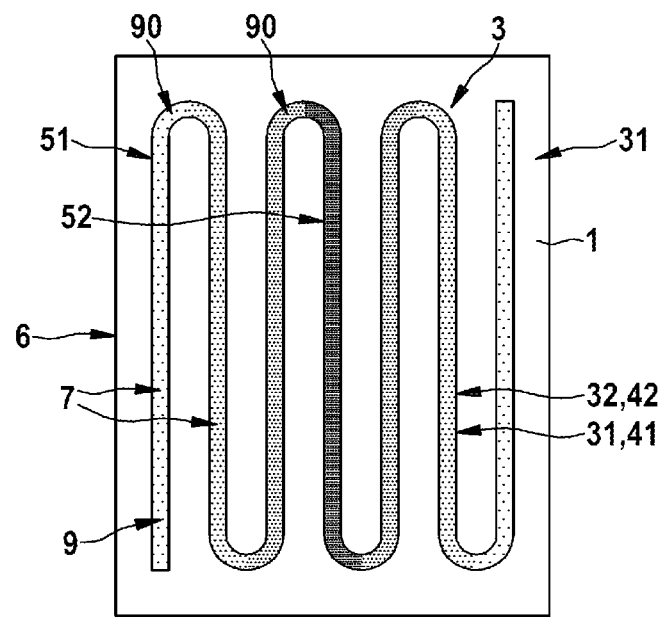
FIG. 1 shows a plan view of a first battery cell after carrying out a first method step.

FIG. 1 shows a plan view of a first battery cell 1 after carrying out a first method step. The first battery cell 1 has in particular a prismatic form.

In this respect, an adhesive 3 was applied to the first battery cell 1 during the first method step. In this case, the adhesive 3 comprises a first component 31 and a second component 32. By way of example, in this respect the first component 31 and the second component 32 can be selected from an epoxy, acrylate, silicone or urea.

The adhesive 3 was applied here during the first method step in such a way that a first proportion 41 of the first component 31 was changed during the application of the adhesive 3 over the first battery cell 1 and that a second proportion 42 of the second component 32 was changed during the application of the adhesive 3 over the first battery cell 1.

As a result, the first battery cell 1 has different regions which each have different first proportions 41 and different second proportions 42. The distribution of the different proportions is indicated here by a differently pronounced hatching of the adhesive 3. In particular, a dulled hatching means a comparatively high proportion of the first component 31 of the adhesive 3.

In particular, the first battery cell 1 has a first region 51 in which the adhesive 3 was applied in such a way that the first proportion 41 of the first component 31 is higher than the second proportion 42 of the second component 32.

In particular, the first battery cell 1 has a second region 52 in which the adhesive 3 was applied in such a way that the second proportion 42 of the second component 32 is higher than the first proportion 41 of the second component 31.

It can be seen here from FIG. 1, for example, that the first region 51 is arranged closer to a peripheral region 6 of the first battery cell 1 than the second region 52. The peripheral region 6 is arranged here, for example, running along the respectively longest side edge.

In the process, in the exemplary embodiment illustrated in FIG. 1, the first component 31 forms a lower adhesive force than the second component 32.

FIG. 1 moreover shows that the adhesive 3 has been applied in a uniformly distributed manner. In this respect, the adhesive 3 can have been applied, for example, with a plurality of portions 7 which are arranged parallel to one another.

FIG. 1 furthermore also shows that the adhesive 3 can have been applied, for example, in a continuously running strand 9. In particular, the plurality of portions 7 which are arranged parallel to one another can have been connected to one another for this purpose by means of a connection 90 of semicircular form.

It is possible in this respect that the first component 31 of the adhesive 3 and the second component 32 of the adhesive 3 have been mixed with one another before the application.

Figure 2:
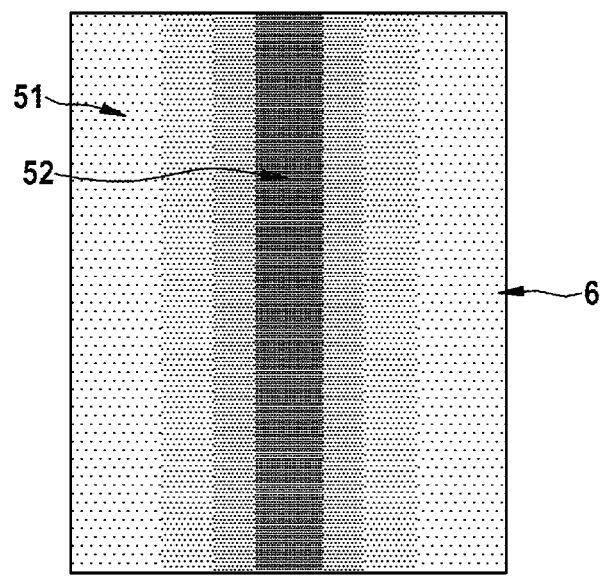
FIG. 2 shows a plan view of a material bond between a first battery cell and a second battery cell.

FIG. 2 shows a plan view of the material bond between the first battery cell 1 and a second battery cell 2. Expressed in other words, this means that that material bond is shown which was produced by the method according to the invention from the first battery cell 1 as per FIG. 1.

In particular, the first region 51 and the second region 52 can be seen here. Furthermore, the peripheral region 6 is also shown.

Figure 3:
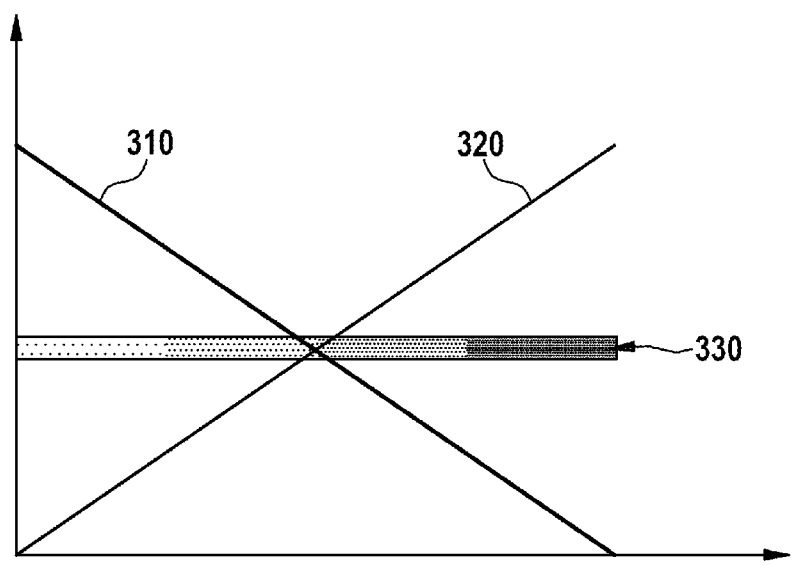
FIG. 3 shows an illustration of the application of different proportions of a first component and a second component and FIG. 4a) through 4f) show further examples of possible material bonds.

FIG. 3 shows an illustration of the application of different proportions 41, 42 of a first component 31 and a second component 32.

In this respect, a first volumetric flow rate 310 of the first component 31, a second volumetric flow rate 320 of the second component 32 and an overall volumetric flow rate 330 are applied over time. The overall volumetric flow rate 330 results from the sum of the first volumetric flow rate 310 and the second volumetric flow rate 320.

It can be seen here that, for example, the first volumetric flow rate 310 decreases over time and the second volumetric flow rate 320 increases over time. In this example, the overall volumetric flow rate 330 remains constant over time.

As a result, for example, an adhesive 3 can be applied which has a higher first proportion 41 of the first component 31 at the start of the application according to FIG. 3 that is shown by way of example, and has a higher second proportion 42 of the second component 32 toward the end. It should be pointed out at this juncture that the first volumetric flow rate 310 and the second volumetric flow rate 320 can be varied as desired over time and the linear profile shown is illustrated in particular only by way of example. It is also not imperatively necessary for the overall volumetric flow rate 330 to be constant over time.

Figure 4:
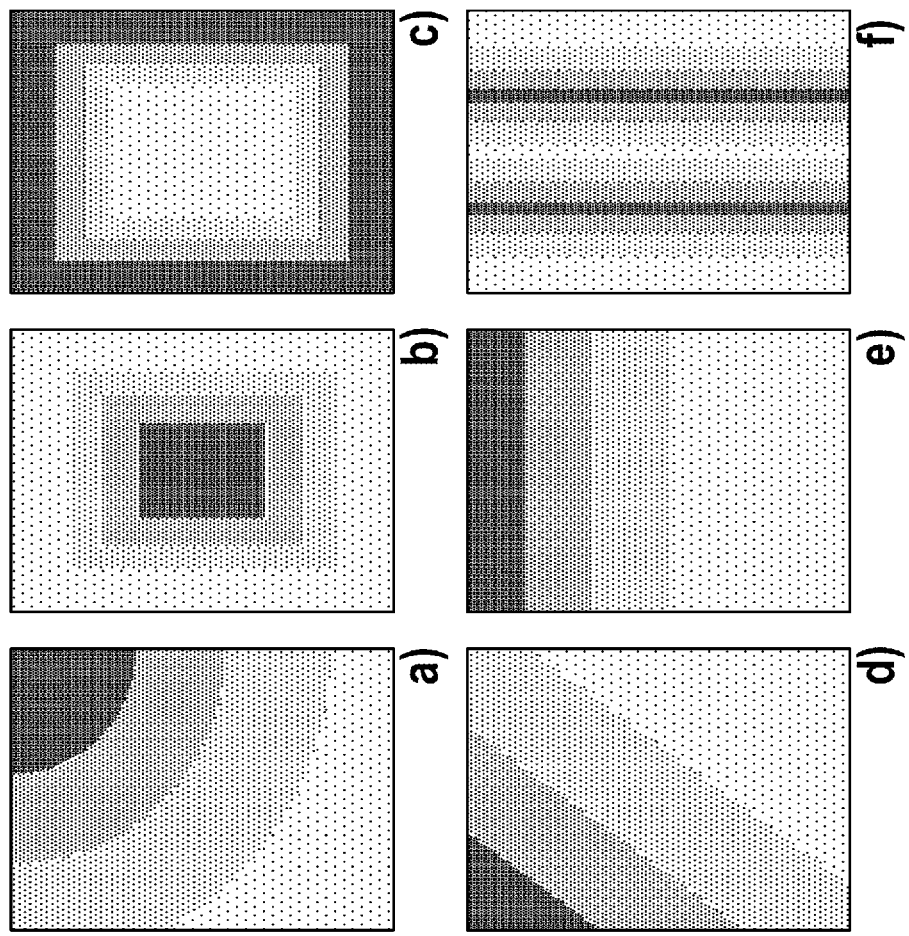

FIG. 4 shows further examples of material bonds, all of which have an inhomogeneous form.

By way of example, FIG. 4a shows an illustration in which a gradient surface of the distribution between the first proportion 41 of the first component 31 and the second proportion 42 of the second component 32 rises, or decreases, running in a manner proceeding radially from a corner point.

By way of example, FIG. 4b shows an illustration in which a gradient surface of the distribution between the first proportion 41 of the first component 31 and the second proportion 42 of the second component 32 partially has a star-shaped pattern.

By way of example, FIG. 4c shows an illustration in which a gradient surface of the distribution between the first proportion 41 of the first component 31 and the second proportion 42 of the second component 32 partially has a window-shaped pattern.

By way of example, FIG. 4d shows an illustration in which a gradient surface of the distribution between the first proportion 41 of the first component 31 and the second proportion 42 of the second component 32 rises, or decreases, parallel to a connection of two opposite corner points.

By way of example, FIG. 4e shows an illustration in which a gradient surface of the distribution between the first proportion 41 of the first component 31 and the second proportion 42 of the second component 32 rises, or decreases, parallel to a connection of two adjacent corner points.

By way of example, FIG. 4f shows an illustration in which a gradient surface of the distribution between the first proportion 41 of the first component 31 and the second proportion 42 of the second component 32 rises, or decreases, parallel to a connection of two adjacent corner points, forming a plurality of high and low planes.

The invention claimed is:

1. A method for forming a connection between a first battery cell (1) and a second battery cell (2), the method comprising
    in a first method step, applying to the first battery cell (1) an adhesive (3) comprising at least one first component (31) and at least one second component (32), wherein a first proportion (41) of the at least one first component (31) and/or a second proportion (42) of the at least one second component (32) is changed during the application of the adhesive (3) to the first battery cell (1), and
    in a second method step, connecting the first battery cell (1) to the second battery cell (2) in such a way that an inhomogeneous material bond is formed between the first battery cell (1) and the second battery cell (2).

2. The method according to claim 1, characterized in that the at least one first component (31) of the adhesive (3) and the at least one second component (32) of the adhesive (3) are mixed with one another before the first method step.

3. The method according to claim 1, characterized in that the adhesive (3) in a first region (51) is applied in such a way that the first proportion (41) of the at least one first component (31) is higher than the second proportion (42) of the at least one second component (32) and the adhesive (3) in a second region (52) is applied in such a way that the second proportion (42) of the at least one second component (32) is higher than the first proportion (41) of the at least one first component (31).

4. The method according to claim 1, characterized in that the adhesive (3) is applied in a uniformly distributed manner.

5. The method according to claim 1, characterized in that the adhesive (3) is applied with a plurality of portions (9) which are arranged parallel to one another.

6. The method according to claim 1, characterized in that the adhesive (3) is applied in a continuously running strand (9).

7. The method according to claim 1, characterized in that the at least one first component (31) and/or the at least one second component (32) are selected from an epoxy, acrylate, silicone or urea.

* * * * *